United States Patent
Jin et al.

(10) Patent No.: US 9,285,978 B2
(45) Date of Patent: *Mar. 15, 2016

(54) USING A SCROLL BAR IN A MULTIPLE PANEL USER INTERFACE

(71) Applicant: International Business Machines Corporation, Armonk, NY (US)

(72) Inventors: Ye Jin, Markham (CA); Corrie H. Kwan, Markham (CA); Zicheng Li, Markham (CA); Shuxun Zhou, Markham (CA)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/161,718

(22) Filed: Jan. 23, 2014

(65) Prior Publication Data

US 2015/0205513 A1    Jul. 23, 2015

(51) Int. Cl.
G06F 3/048 (2013.01)
G06F 3/0485 (2013.01)
G06F 3/0481 (2013.01)

(52) U.S. Cl.
CPC ........ G06F 3/04855 (2013.01); G06F 3/04817 (2013.01)

(58) Field of Classification Search
CPC .. G06F 3/048; G06F 3/04855; G06F 3/04817
USPC ....................................................... 715/786
See application file for complete search history.

(56) References Cited

U.S. PATENT DOCUMENTS

| 7,428,709 B2 | 9/2008 | Forstall et al. | |
| 8,302,026 B2 | 10/2012 | Wang et al. | |
| 2003/0193524 A1 | 10/2003 | Bates et al. | |
| 2006/0085741 A1 | 4/2006 | Weiner et al. | |
| 2006/0236261 A1 | 10/2006 | Forstall et al. | |
| 2008/0082937 A1* | 4/2008 | Bennah et al. | 715/781 |
| 2009/0088964 A1* | 4/2009 | Schaaf et al. | 701/200 |
| 2010/0095238 A1* | 4/2010 | Baudet | 715/784 |
| 2012/0131497 A1 | 5/2012 | Jitkoff | |
| 2015/0205514 A1 | 7/2015 | Jin et al. | |

FOREIGN PATENT DOCUMENTS

| WO | 2005045588 A2 | 5/2005 |
| WO | 2008021670 A2 | 2/2008 |

OTHER PUBLICATIONS

Jin et al., "Using a Scroll Bar in a Multiple Panel User Interface", U.S. Appl. No. 14/481,975, filed Sep. 10, 2014.

(Continued)

*Primary Examiner* — Angie Badawi
(74) *Attorney, Agent, or Firm* — Alexa L. Ashworth (57) ABSTRACT

A method for using a scroll bar in a multiple panel user interface. The method includes determining that two or more panels are displayed on a user interface, the two or more panels operated by a same scroll bar. The method includes detecting a cursor movement over the same scroll bar and responsive to the cursor movement over the scroll bar, displaying an icon. The method includes receiving an active panel selection via the icon and indicating the selected panel is active. The method further includes detecting movement of the same scroll bar on the selected panel and scrolling a displayed content of the selected panel corresponding to the movement of the same scroll bar.

10 Claims, 6 Drawing Sheets

(56) References Cited

OTHER PUBLICATIONS

IP.com, "Scroll Bar Control with Integrated Methods for Displaying the Position of Slided Objects", An IP.com Prior Art Database Technical Disclosure, Authors et. al.: Siemens Ag, Juergen Carstens, Original Publication Date: Nov. 23, 2009, IP.com No. IPCOM000189283D, IP Electronic Publication: Nov. 3, 2009, Copyright: Siemens Ag 2009, <http://ip.com/IPCOM/000189283>.

MacNews Network, "Apple patent is for multiple-panel scrolling", All contents are Copyright 1984-2010 by Xplain Corporation, All rights reserved, <http://www.macnews.com/content/apple-patent-multiple-panel-scrolling>, printed on Jan. 21, 2014.

* cited by examiner

USING A SCROLL BAR IN A MULTIPLE PANEL USER INTERFACE

FIELD OF THE INVENTION

The present invention relates generally to the field of user interactive functions, and more particularly to using a scroll bar in a multiple panel user interface.

BACKGROUND

A graphical user interface (GUI) is a type of user interface through which users can interact with a machine, by visualization and manipulation of elements on the user interface, such as graphical icons. For a user to interact with a GUI, interface devices are used, including a computer keyboard or cursor control devices, such as a computer mouse or touchpad. One such object that can be manipulated in the GUI, with an interface device, is a scroll bar. A scroll bar is a horizontal or vertical bar in a GUI that allows a user to move the viewing area of content, such as text or images that span more than one viewing window.

One example of a software application that makes use of scroll bars is a web browser. When using a web browser, users will often open two or more interfaces at the same time in order to view content from multiple sources simultaneously. One method of displaying multiple interfaces is through the use of panels. A panel is a particular arrangement of information grouped together for presentation to users within a window. The ability to display multiple panels and use a scroll bar to move through the content of the panels may be highly desirable to users, as this can increase usability and functionality for the user.

SUMMARY

Embodiments of the present invention disclose a method, computer program product, and computer system for using a scroll bar in a multiple panel user interface. The method includes determining, by one or more computer processors, that two or more panels are displayed on a user interface, the two or more panels operated by a same scroll bar. The method includes detecting, by one or more computer processors, a cursor movement over the same scroll bar and responsive to the cursor movement over the scroll bar, displaying an icon. The method includes receiving, by one or more computer processors, an active panel selection via the icon and indicating the selected panel is active. The method further includes detecting, by one or more computer processors, movement of the same scroll bar on the selected active panel and scrolling a displayed content of the selected active panel corresponding to the movement of the same scroll bar.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by, or in connection with, an instruction execution system, apparatus, or device.

A computer-readable signal medium may include a propagated data signal with computer-readable program code embodied therein, for example, in baseband or as part of a carrier wave. Such a propagated signal may take any of a variety of forms including, but not limited to, electro-magnetic, optical, or any suitable combination thereof. A computer-readable signal medium may be any computer-readable medium that is not a computer-readable storage medium and that can communicate, propagate, or transport a program for use by, or in connection with, an instruction execution system, apparatus, or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process, such that the instructions which execute on the computer or other programmable apparatus provide processes for implementing the functions/acts specified in the flowchart and/or block diagram block or blocks.

Figure 1:
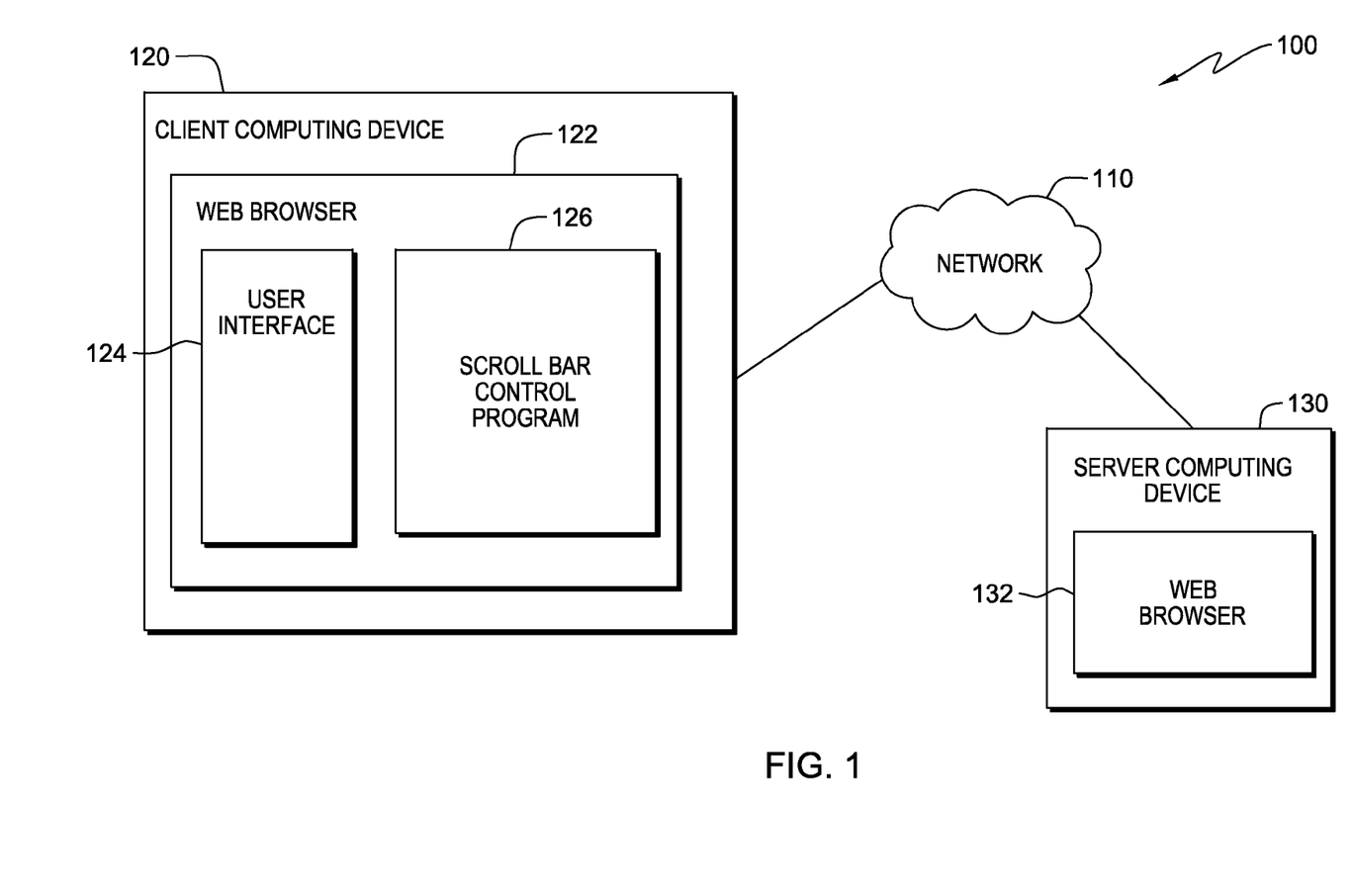
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 120 and server computing device 130, all interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communication between client computing device 120 and server computing device 130.

In the depicted embodiment, client computing device 120 includes web browser 122, user interface (UI) 124 and scroll bar control program 126. In various embodiments of the present invention, client computing device 120 can be a laptop computer, a tablet computer, a netbook computer, a personal computer (PC), a desktop computer, a personal digital assistant (PDA), a smart phone, or any programmable electronic device capable of communicating with server computing device 130 via network 110. In an exemplary embodiment of the present invention, a user operating client computing device 120 can locate multiple webpages on web browser 122 and display the webpages in a panel view, using UI 124. Client computing device 120 may include internal and external hardware components, as depicted and described in further detail with respect to FIG. 4.

Web browser 122 is a software application capable of retrieving and presenting information obtained from the World Wide Web. In various embodiments, web browser 122 may be an information retrieval system designed to provide access to information stored on a computer system or within a computing environment, for example, information stored on server computing device 130 in distributed data processing environment 100.

UI 124 may be, for example, a graphical user interface (GUI) or a web user interface (WUI) and can display text, documents, web browser windows, user options, application interfaces, and instructions for operation. A user interface, such as UI 124, refers to the information (such as graphic, text, and sound) a program presents to a user and the control sequences the user employs to control the program. There are many types of user interfaces that allow users to interact with electronic devices, such as a computer keyboard and mouse, through graphical icons and visual indicators, such as secondary notation, as opposed to text-based interfaces, typed command labels, or text navigation.

Scroll bar control program 126 can be an application, plug-in, service, or a built-in functionality for implementation on UI 124 of web browser 122. Scroll bar control program 126, once invoked, detects multiple panels displayed in UI 124. Scroll bar control program 126 determines a default active panel in UI 124 and, when triggered by a cursor movement over the scroll bar, displays a small icon of the multi-panel user interface next to the scroll bar. Scroll bar control program 126 allows a user of client computing device 120, using UI 124, to operate a scroll bar in a selected panel to alter the view in the selected panel while maintaining the view in any other of the multiple panels displayed via UI 124. In an exemplary embodiment, the selected active panel is the only panel that moves when a user scrolls through the content until a different active panel is selected from the icon by a user.

Server computing device 130 includes web browser 132. Server computing device 130 may be a management server, a web server, or any other electronic device or computing system capable of receiving and sending data. In other embodiments, server computing device 130 can be a laptop computer, a tablet computer, a netbook computer, a personal computer (PC), a desktop computer, a personal digital assistant (PDA), a smart phone, or any programmable electronic device capable of communicating with client computing device 120 via network 110, and with various components and devices within distributed data processing environment 100. Server computing device 130 can store the files and data necessary to display a webpage on a computer via a web browser.

Web browser 132 is a software application capable of retrieving and presenting information obtained from the World Wide Web, for example, via network 110. In an embodiment of the present invention, server computing device 130 can represent a computing system utilizing clustered computers and components to act as a single pool of seamless resources when accessed through a network. This is a common implementation for data centers and for cloud computing applications.

Figure 2:
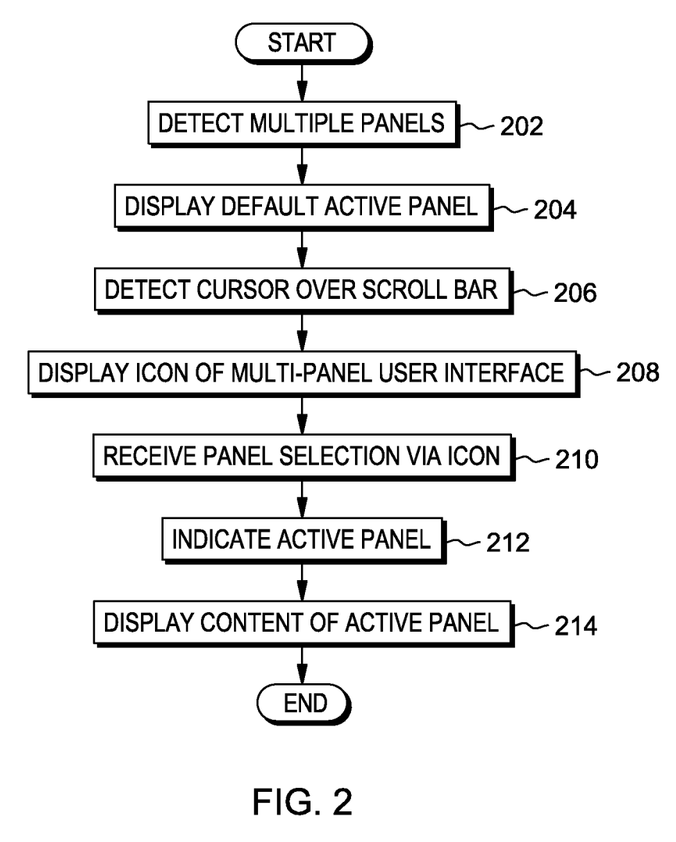
FIG. 2 is a flowchart depicting operational steps of a scroll bar control program for using a scroll bar in a multi-panel user interface, in accordance with an embodiment of the present invention.

FIG. 2 is a flowchart depicting operational steps of scroll bar control program 126 for using a scroll bar in a multi-panel user interface, in accordance with an embodiment of the present invention.

Scroll bar control program 126 detects multiple panels in UI 124 (step 202). Responsive to detecting that a user has opened a multi-panel viewing program in web browser 122 and displays the panels in UI 124, scroll bar control program 126 can be operated. Scroll bar control program 126 detects the multiple panels, and the layout of the multiple panels.

Scroll bar control program 126 displays a default active panel (step 204). Scroll bar control program 126 determines and displays a default active panel among the multiple panels opened in web browser 122 and displayed on UI 124. Scroll bar control program 126 can anticipate a user experience based on a region a user is located in, for example, a default active panel may be the top left panel displayed on UI 124.

Scroll bar control program 126 detects a cursor over the scroll bar (step 206). Scroll bar control program 126 detects that a user has moved the cursor over the scroll bar, for example, by using a mouse to control the cursor. A command is executed by known methods in the art, for example, by hovering a mouse cursor over an icon or a scroll bar. Hovering is a state in which the cursor is positioned within the bounds of a specific area for a predetermined amount of time. The scroll bar being utilized with scroll bar control program 126 can be located horizontal to the panel or vertical to the panel. In an exemplary embodiment of the present invention, two scroll bars are located on user interface 124, one located horizontal and one located vertical to the panel, and either one of the two scroll bars can be invoked by scroll bar control program 126 at one time, dependent on the cursor movement of the user.

Scroll bar control program 126 displays an icon of the multi-panel user interface (step 208). In response to detection of a user hovering a mouse cursor over the scroll bar, scroll bar control program 126 displays an icon. In an exemplary embodiment, the icon may be located adjacent to the upper left corner of the cursor. In other embodiments, the icon may be, for example, an additional icon on the toolbar, a separate pop-up window, or in any of the four corners of the screen. The icon viewed by the user is a small scale representation of the multi-panel user interface, displaying all panel layouts in proportion to their respective panels represented on UI 124, for example, multiple webpages opened within web browser 122. In one embodiment of the present invention, the icon will disappear from UI 124 in response to scroll bar control program 126 detecting that a user has begun scrolling and the icon will reappear on UI 124 in response to scroll bar control program 126 determining that a user has stopped scrolling.

Scroll bar control program 126 receives a panel selection via icon (step 210). In response to a user selecting one panel from the icon displaying the multi-panel user interface, scroll bar control program 126 receives an indication that one panel has been selected as an active panel.

Scroll bar control program 126 indicates the active panel (step 212). In response to a user selecting one panel from an icon, scroll bar control program 126 displays the selected panel as the active panel in UI 124. In an exemplary embodiment of the present invention, scroll bar control program 126 indicates the selected active panel by highlighting the title bar of the active panel. In other embodiments of the present invention, scroll bar control program 126 indicates the active panel by highlighting the entire panel, through the use of an icon within the active panel, by blurring the content in each inactive panel, or brightening the backlight of the active panel and dimming the backlight of the inactive panel(s).

Scroll bar control program 126 displays the content of the active panel (step 214). In response to cursor movement of the scroll bar, scroll bar control program 126 displays the corresponding content of the active panel in UI 124. The content of the active panel may be a webpage, a text document, or an image, among other content. In an exemplary embodiment of the present invention, the position of the scroll bar(s) proportionately reflects the actual position of the content in the selected viewing panel. In another embodiment of the present invention, the position of the content in a panel, as well as the proportionate position of the scroll bar(s) within each panel, will remain after a user selects a different panel from the icon as the active panel. For example, a user is viewing content that is halfway down a webpage. As such, the vertical scroll bar is located halfway down the page, corresponding to the position of that content. If the user switches to a second panel, the scroll bar is moved back to the top of the vertical scroll until scrolling occurs on that panel. The user then activates the first webpage again. The position of the content was saved, and the vertical scroll bar is located halfway down the page, which corresponds with the position of that saved content.

Figure 3A:
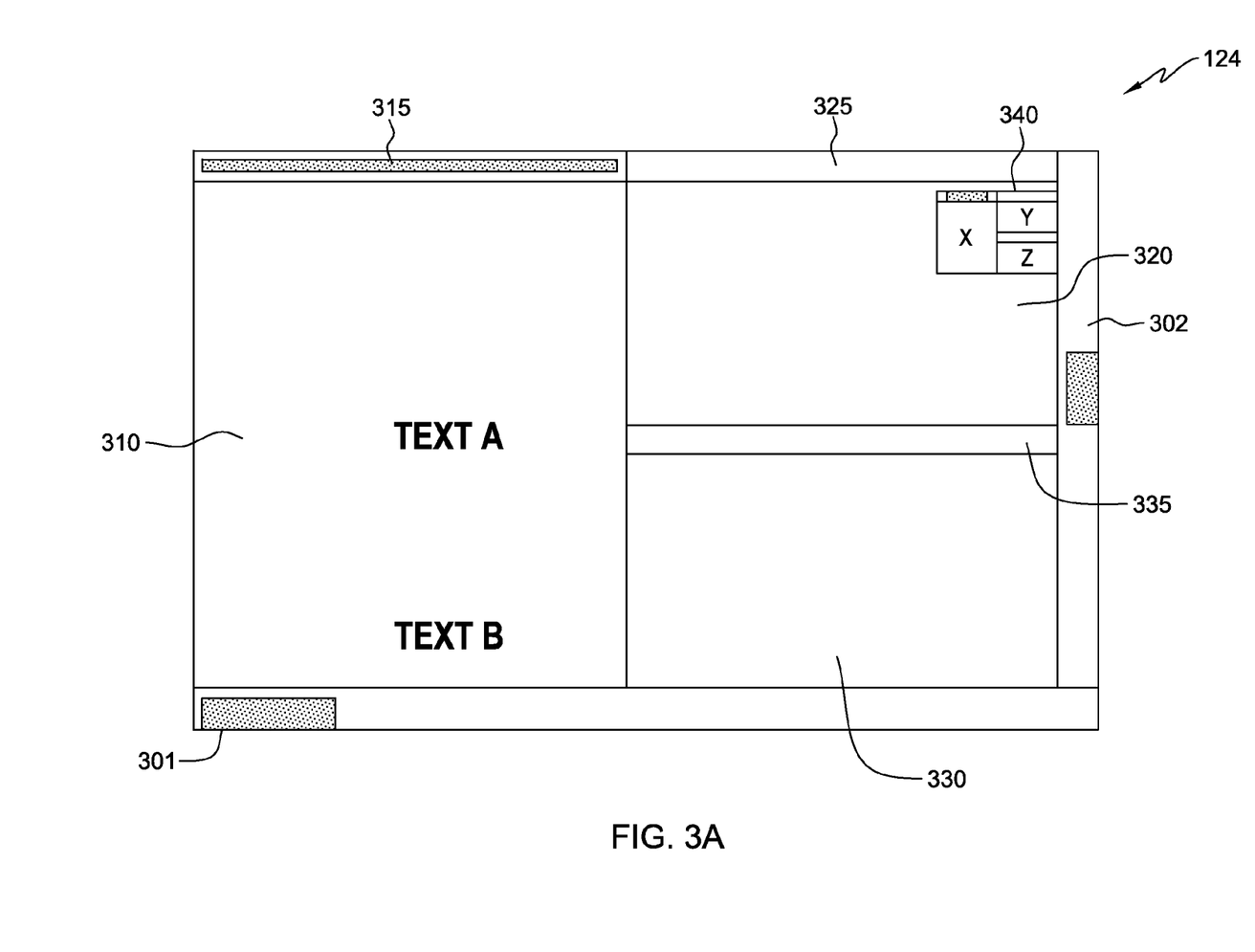
FIG. 3A illustrates an exemplary user interface depicting a display of the scroll bar control program of FIG. 2, in accordance with an embodiment of the present invention.

FIG. 3A illustrates an exemplary user interface depicting a display of UI 124 for operation of scroll bar control program 126, in accordance with an embodiment of the present invention.

In the exemplary embodiment depicted in FIG. 3A, a user views UI 124, containing three panels, panel 310, panel 320, and panel 330, which can be scrolled horizontally or vertically by using scroll bar 301 and scroll bar 302, respectively. As discussed above with reference to FIG. 2, scroll bar program 126 can use either a horizontal scroll bar, such as scroll bar 301, or a vertical scroll bar, such as scroll bar 302. For example, in FIG. 3A, TEXT A and TEXT B are the panel 310 content, and vertical scroll bar 302 is scrolled halfway down, indicating that the user is halfway down the content in panel 310.

Each panel, panel 310, panel 320, and panel 330 has a title bar, title bar 315, title bar 325, and title bar 335, respectively. The title bar of the selected active panel is highlighted, to indicate it is the active panel. For example, in FIG. 3A, title bar 315 is highlighted to indicate that panel 310 is the active panel. Scroll bar control program 126 displays icon 340 of the multi-panel user interface, which is a small scale proportional display of the panels in UI 124. For example in icon 340, X corresponds to panel 310, Y corresponds to panel 320, and Z corresponds to panel 330. The active panel is also indicated on icon 340. In the depicted embodiment, the active panel is highlighted.

Figure 3B:
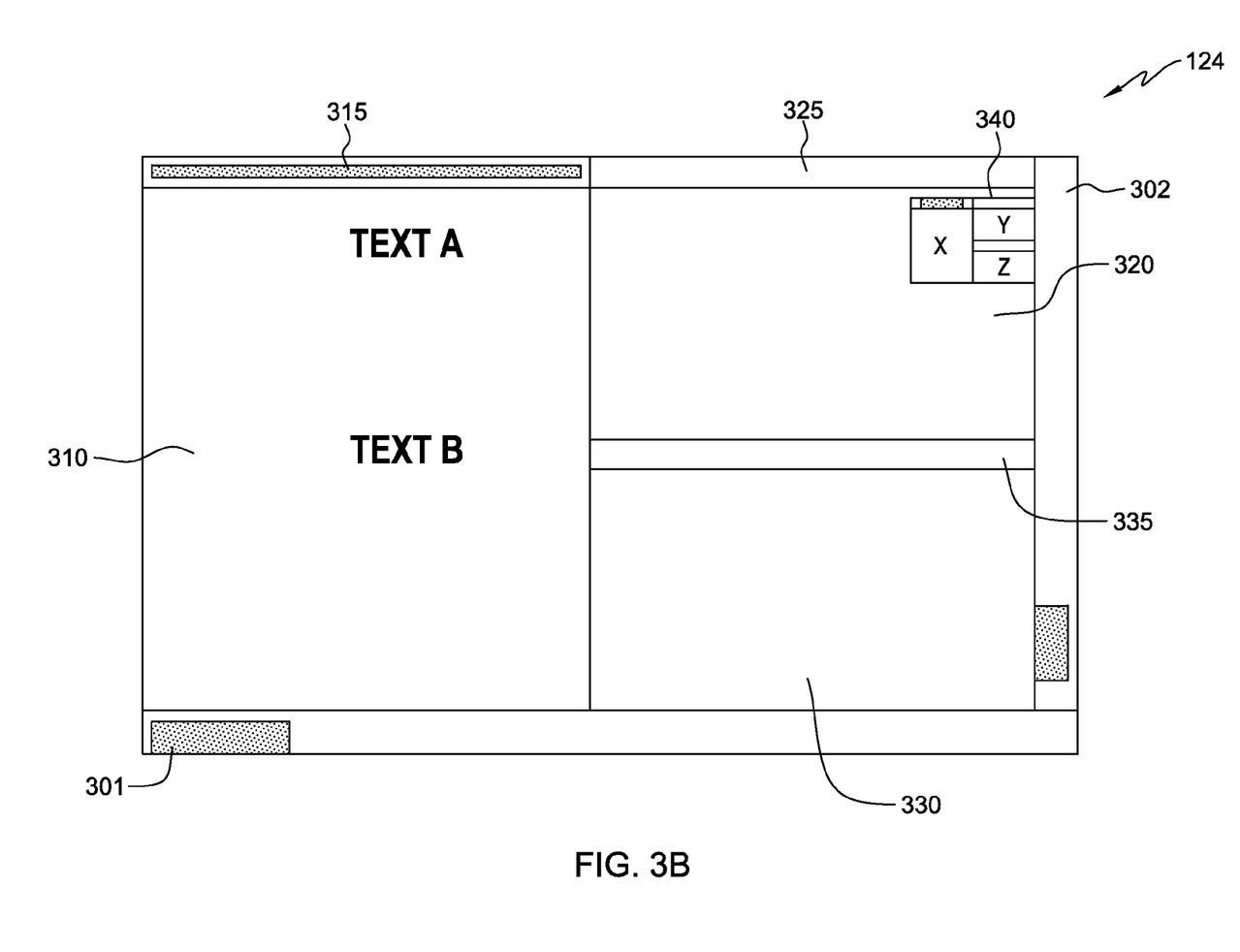
FIG. 3B illustrates an exemplary user interface depicting a scrolling operation of the scroll bar control program of FIG. 2, in accordance with an embodiment of the present invention.

FIG. 3B illustrates an exemplary user interface depicting the scrolling operation of scroll bar control program 126, in accordance with an embodiment of the present invention.

In an exemplary embodiment depicted in FIG. 3B, a user views UI 124 containing three panels, panel 310, panel 320, and panel 330, each having a title bar, title bar 315, title bar 325, and title bar 335, respectively. Title bar 315 is highlighted, indicating that panel 310 is the active panel. TEXT A and TEXT B, the panel 310 content, have moved up on panel 310, in comparison to the content location on FIG. 3A, indicating that a user has scrolled down panel 310, using vertical scroll bar 302. Vertical scroll bar 302 has also moved down, corresponding to the location of the content, TEXT A and TEXT B, in panel 310.

Figure 3C:
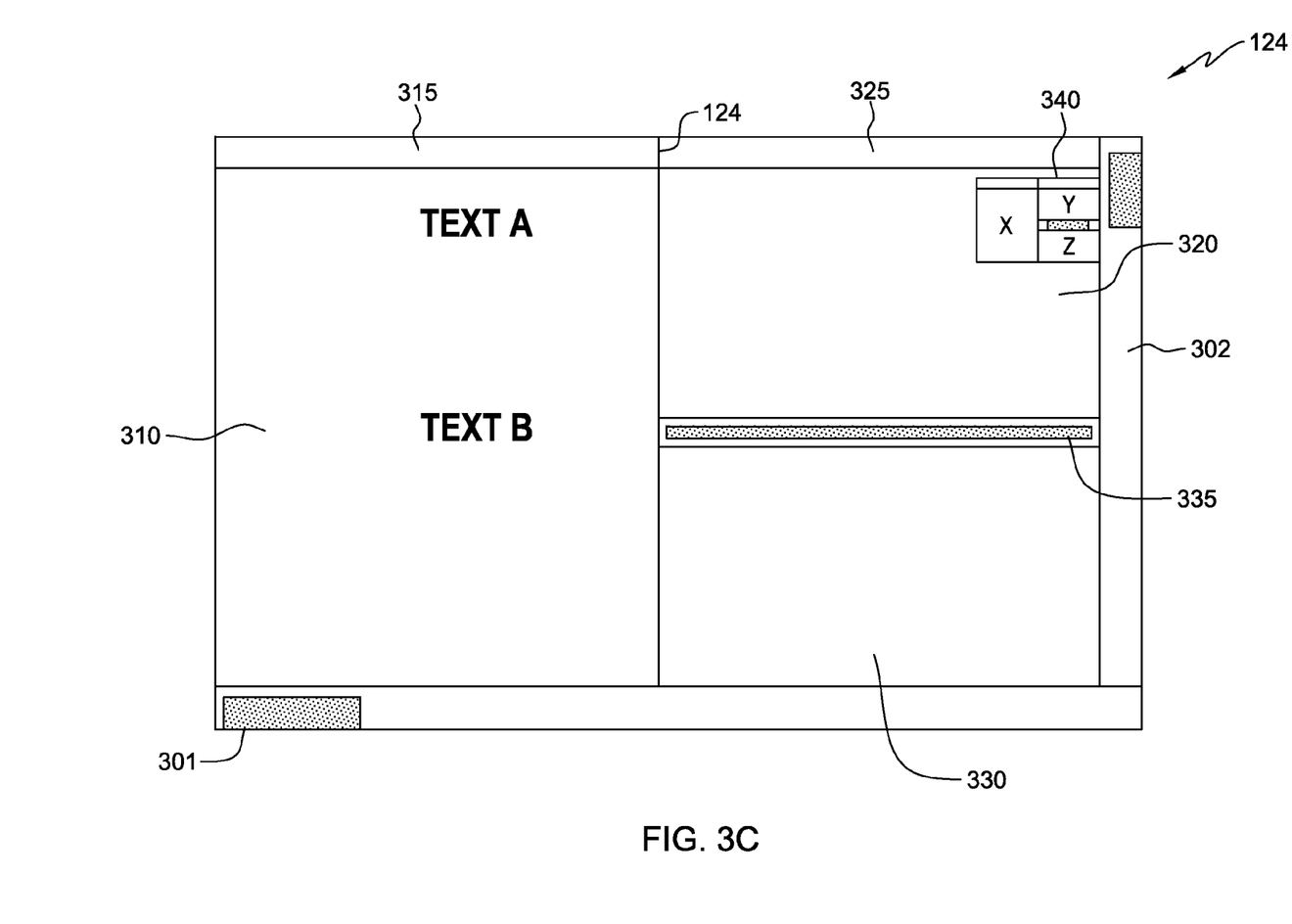
FIG. 3C illustrates an exemplary user interface depicting a panel selection operation of the scroll bar control program of FIG. 2, in accordance with an embodiment of the present invention.

FIG. 3C illustrates an exemplary user interface depicting the panel selection operation of scroll bar control program 126, in accordance with an embodiment of the present invention.

As shown in FIG. 3C, panel 330 is selected as the active panel, which is indicated by scroll bar control program 126 highlighting the corresponding title bar 335. Icon 340 indicates that panel 330 is the active panel, by highlighting the corresponding title bar within icon 340. As a user moves to a different active panel, the location of scroll bars 301 and 302 always correspond to the position of the panel content in the selected active panel. For example, as a user selects panel 330 as the active panel, scroll bar 302 moves to the top of the page, to correspond with the position of the content in panel 330. Additionally, the content in panel 310, TEXT A and TEXT B, which were scrolled up in FIG. 3B, remain in that same position after another panel is selected as the active panel.

Figure 4:
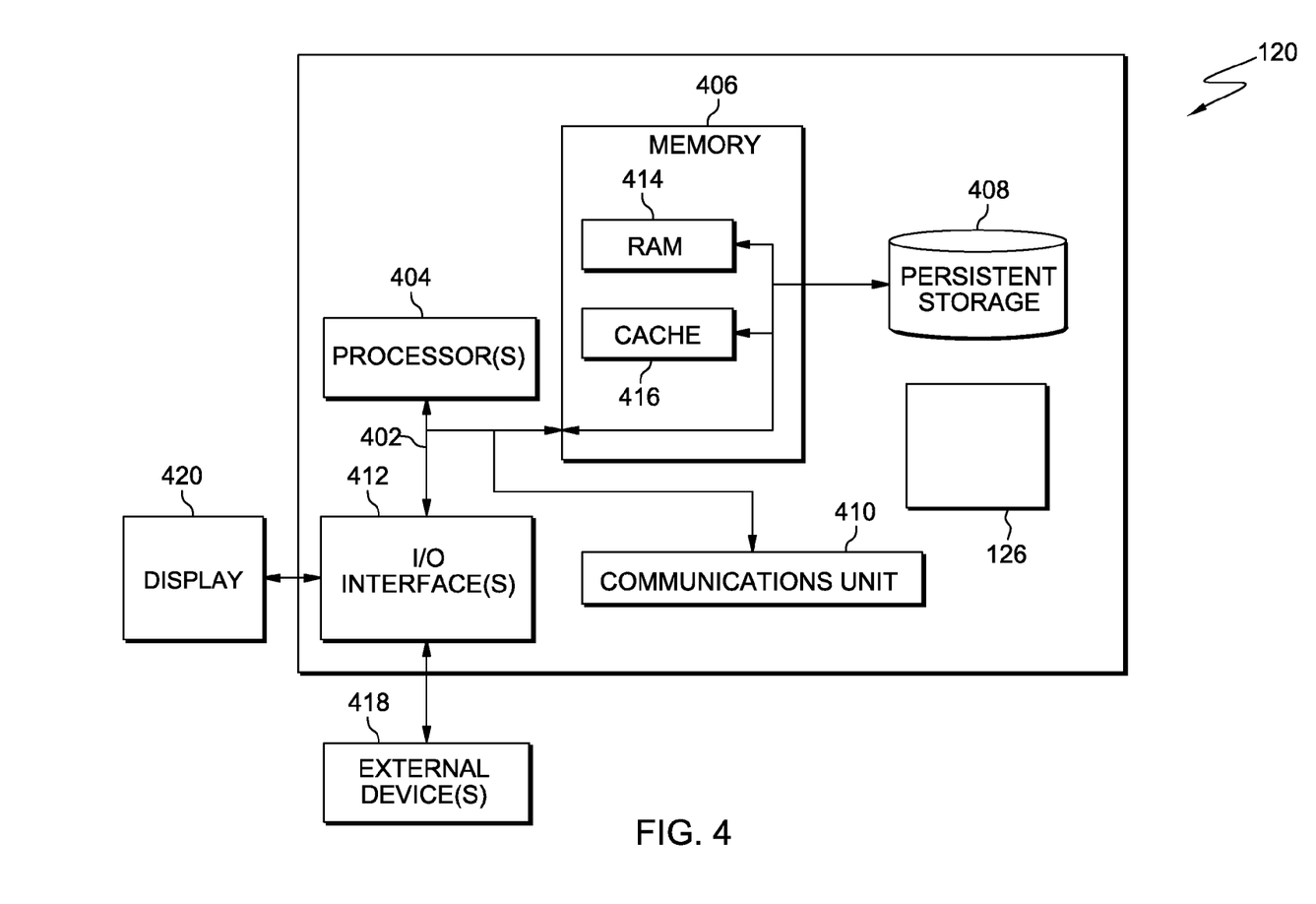
FIG. 4 depicts a block diagram of internal and external components of a data processing system, such as the client computing device of FIG. 1, in accordance with an embodiment of the present invention.

FIG. 4 depicts a block diagram of components of client computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Scroll bar control program 126 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between client computing device 120 and server computing device 130. In these examples, communications unit 410 includes one or more network interface cards. Communications unit 410 may provide communications through the use of either or both physical and wireless communications links. Scroll bar control program 126 may be downloaded to persistent storage 408 through communications unit 410.

I/O interface(s) 412 allows for input and output of data with other devices that may be connected to client computing device 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., Scroll bar control program 126, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for using a scroll bar in a multiple panel user interface, the computer program product comprising:

one or more computer-readable hardware storage media and program instructions stored on the one or more computer-readable hardware storage media, the program instructions comprising:

program instructions to determine that two or more panels are displayed on a user interface, the two or more panels being operated by a same scroll bar;

program instructions to detect a cursor movement over the same scroll bar;

responsive to the cursor movement over the same scroll bar, program instructions to display an icon;

program instructions to receive an active panel selection via the icon;

program instructions to indicate that the selected panel is active;

program instructions to detect movement of the same scroll bar on the selected active panel;

program instructions to scroll a displayed content of the selected active panel corresponding to the movement of the same scroll bar;

program instructions to save a position of the displayed content and corresponding position of the same scroll bar within the active panel;

responsive to subsequent selection of the panel, program instructions to display the saved position of the displayed content and corresponding position of the same scroll bar; and program instructions to proportion a length of the scroll bar in the icon to the saved position of said same scroll bar within the respective active panel.

2. The computer program product of claim 1, wherein the program instructions to display an icon further comprise program instructions to include a small scale version of the user interface depicting the two or more panels, and wherein each of the two or more panels can be selected from the icon using the cursor.

3. The computer program product of claim 1, further comprising:

program instructions to detect a scrolling movement of the same scroll bar; and responsive to detecting the scrolling movement of the same scroll bar, program instructions to remove the icon from display.

4. The computer program product of claim 3, further comprising:

program instructions to detect the scrolling movement of the same scroll bar has stopped; and responsive to detecting the scrolling movement of the same scroll bar has stopped, program instructions to display the icon.

5. The computer program product of claim 1, further comprising:

program instructions to detect that a second panel of the two or more panels is active;

program instructions to detect movement of the same scroll bar; and program instructions to scroll displayed content of the second panel corresponding to the movement of the same scroll bar.

6. A computer system for using a scroll bar in a multiple panel user interface, the computer system comprising:

one or more computer processors;

one or more computer-readable storage media;

program instructions stored on the one or more computer-readable storage media for execution by at least one of the one or more processors, the program instructions comprising:

program instructions to determine that two or more panels are displayed on a user interface, the two or more panels being operated by a same scroll bar;

program instructions to detect a cursor movement over the same scroll bar;

responsive to the cursor movement over the same scroll bar, program instructions to display an icon;

program instructions to receive an active panel selection via the icon;

program instructions to indicate that the selected panel is active;

program instructions to detect movement of the same scroll bar on the selected active panel; and program instructions to scroll a displayed content of the selected active panel corresponding to the movement of the same scroll bar;

program instructions to save a position of the displayed content and corresponding position of the same scroll bar within the active panel;

responsive to subsequent selection of the panel, program instructions to display the saved position of the displayed content and corresponding position of the same scroll bar; and program instructions to proportion a length of the scroll bar in the icon to the saved position of said same scroll bar within the respective active panel.

7. The computer system of claim 6, wherein the program instructions to display an icon further comprise program instructions to include a small scale version of the user interface depicting the two or more panels, and wherein each of the two or more panels can be selected from the icon using the cursor.

8. The computer system of claim 6, further comprising:

program instructions to detect a scrolling movement of the same scroll bar; and responsive to detecting the scrolling movement of the same scroll bar, program instructions to remove the icon from display.

9. The computer system of claim 8, further comprising:

program instructions to detect the scrolling movement of the same scroll bar has stopped; and responsive to detecting the scrolling movement of the same scroll bar has stopped, program instructions to display the icon.

10. The computer system of claim 6, further comprising:

program instructions to detect that a second panel of the two or more panels is active;

program instructions to detect movement of the same scroll bar; and program instructions to scroll displayed content of the second panel corresponding to the movement of the same scroll bar.

* * * * *